US005398395A

United States Patent [19]

Woolls

[11] Patent Number: 5,398,395

[45] Date of Patent: Mar. 21, 1995

[54] BANDING APPARATUS AND METHOD

[75] Inventor: Peter J. Woolls, Brightlingsea, England

[73] Assignee: Graham Labelling Systems Limited, United Kingdom

[21] Appl. No.: 122,898

[22] Filed: Sep. 16, 1993

[51] Int. Cl.[6] ........................ B29C 63/42; B65B 41/06; B65B 53/02; B65B 11/38

[52] U.S. Cl. ........................................ 29/417; 29/447; 29/33 K; 29/38 C; 156/86; 156/568; 156/521; 53/292; 53/295; 53/399; 53/137.2; 414/737; 83/152

[58] Field of Search ................. 156/86, 566, 567, 568, 156/521, 354, 256, 293; 29/417, 447, 823, 800, 38 C, 33 K, 56.6; 53/290, 291, 292, 295, 296, 297, 298, 398, 399, 137.1, 137.2, 582, 585; 83/152, 100; 414/737, 738; 901/40

[56] References Cited

U.S. PATENT DOCUMENTS

| | | | |
|---|---|---|---|
| 3,974,628 | 8/1976 | Konstantin | 53/291 |
| 4,184,309 | 1/1980 | Amberg | 53/399 |
| 4,215,460 | 8/1980 | Amberg et al. | 29/429 |
| 4,293,364 | 10/1981 | Fujio | 156/344 |
| 4,318,685 | 3/1982 | Konstantin | 425/508 |
| 4,497,156 | 2/1985 | Scheidegger | 53/399 |
| 4,519,186 | 5/1985 | Winter et al. | 53/585 |
| 4,562,684 | 1/1986 | Dreher | 53/64 |
| 4,744,206 | 5/1988 | Winter | 53/585 |

*Primary Examiner*—Michael W. Ball
*Assistant Examiner*—Francis J. Lorin
*Attorney, Agent, or Firm*—Andrus, Sceales, Starke & Sawall

[57] ABSTRACT

Apparatus for applying a sleeve of heat-shrink material (a "band") to a container comprises a rotary drum having a plurality of upstanding heads. A web of banding material is intermittently advanced and lengths cut off, each cut length being held by fingers in the path of a gripper head mounted on the rotary drum. Each head has forward-facing vacuum port through which air is drawn on a timed basis, so that a band 30 will be picked-up and held by one side face as the gripper head passes the fingers. The resilience of the banding material allows the band partially to open out as it is transferred by the gripper head. The rotation of the drum is synchronized to advancement of the containers, so that a held band is rolled on to the top of a container, the container serving to assist in the opening-out of the band, whereat the band is released by the gripper head.

17 Claims, 6 Drawing Sheets

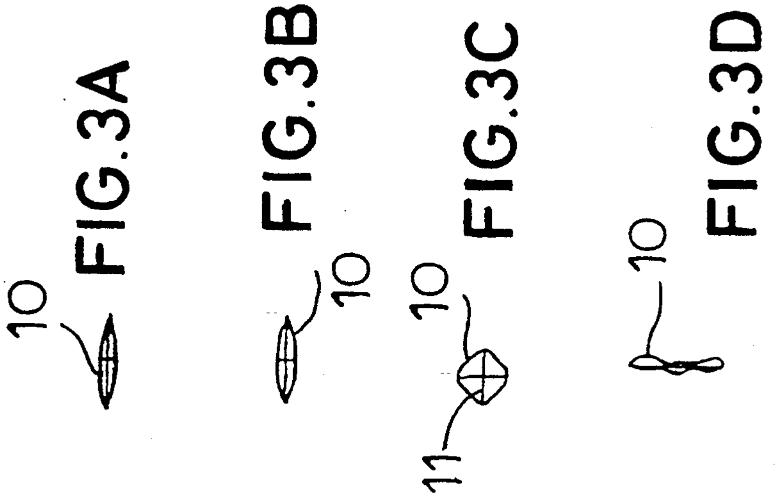
FIG.3A
FIG.3B
FIG.3C
FIG.3D
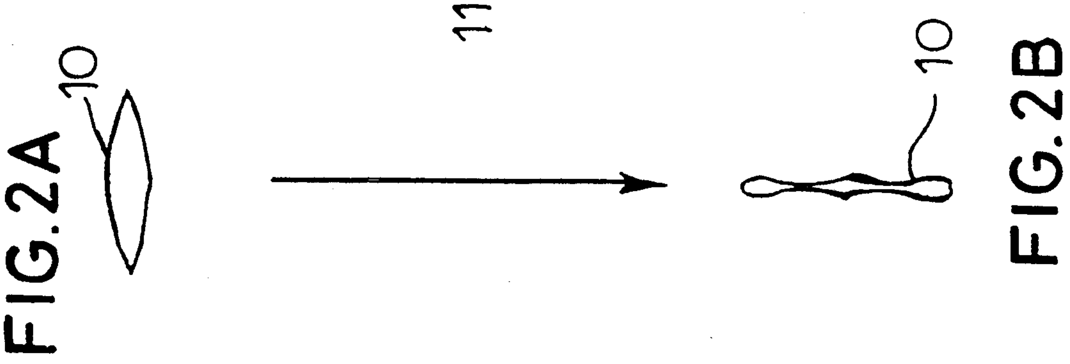
FIG.2A
FIG.2B
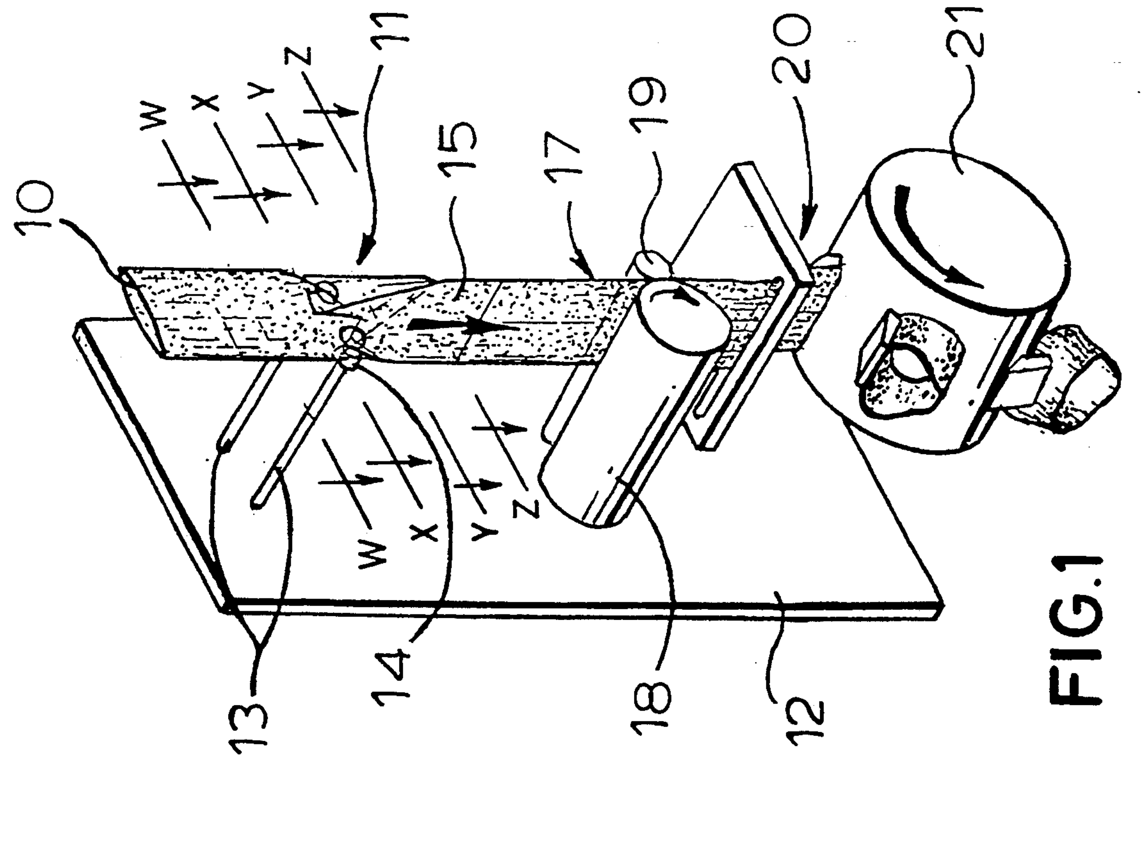
FIG.1

FIG. 8
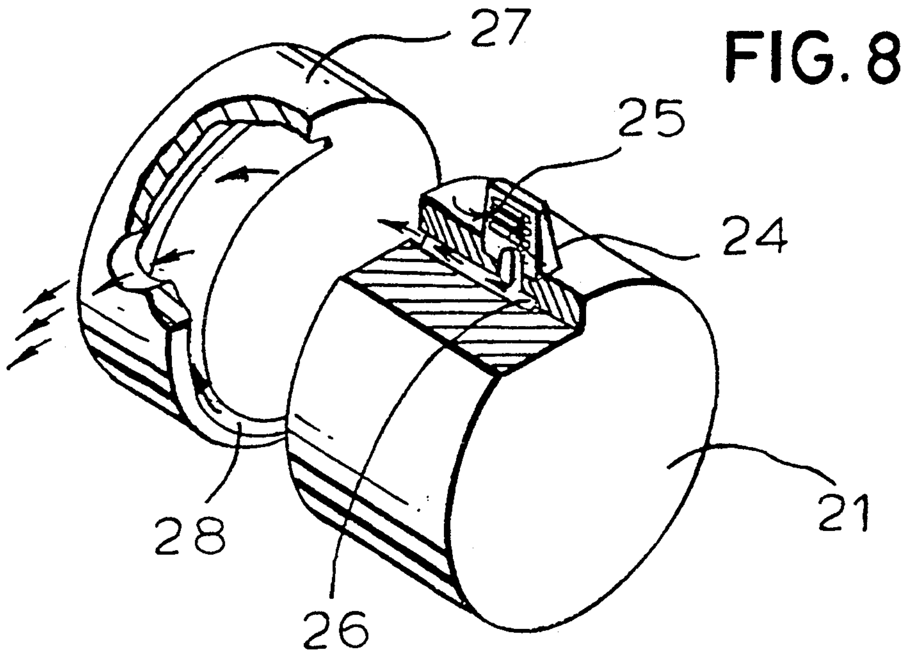
FIG.9A
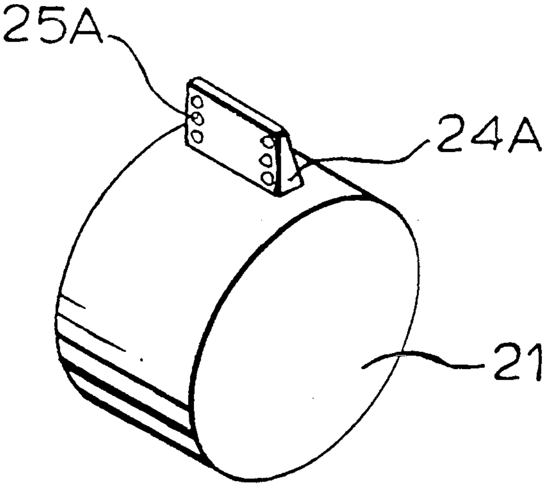
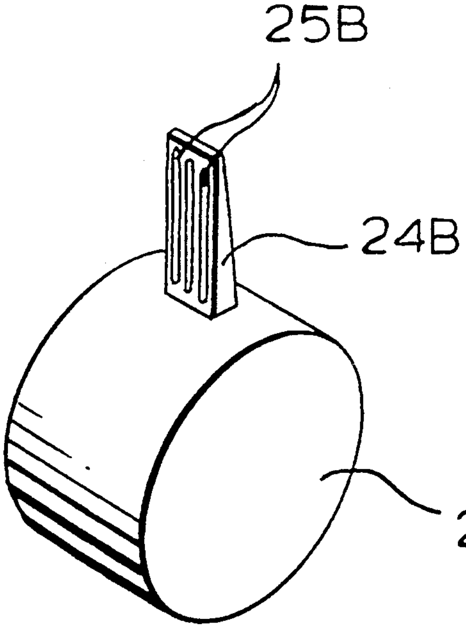
FIG.9B
FIG.9C
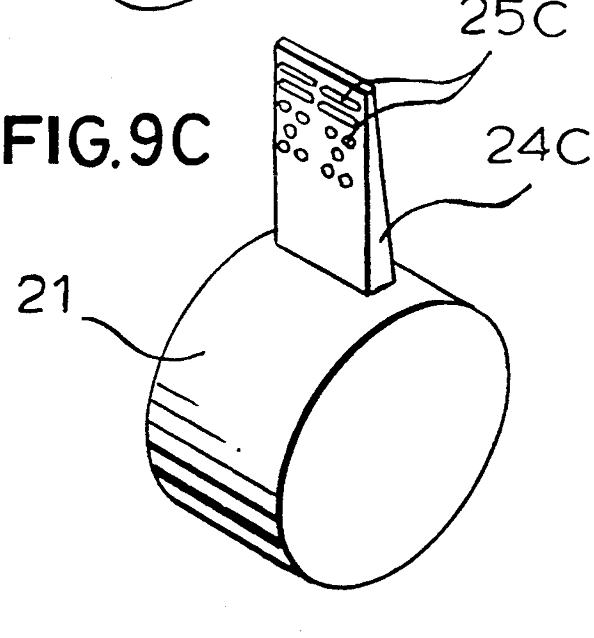

BANDING APPARATUS AND METHOD

BACKGROUND TO THE INVENTION

This invention relates to apparatus for applying a band (as defined hereinbelow) to a container. The invention also relates to methods of applying such a band to a container.

It is frequently desirable for a manufacturer of products sold in containers having removable lids to apply some kind of seal to the lid, so that the ultimate purchaser or user of the product will be assured that the container contents have not been tampered with, following the application of the seal. In the food industry, one kind of seal commonly employed comprises a length of tubular heat-shrink material which is placed over the container lid and extends over the container for at least part of the length thereof, the heat-shrink material then being shrunk by the application of heat whereby the container lid may be removed only by destroying the shrunk material. Removal of the shrunk material may be facilitated by perforating the material prior to its application to a container, so as to give a line of weakness along which the material may more readily be torn.

A seal formed from tubular heat-shrink material as described above is commonly referred to as a "band" when applied to the upper part of a container adjacent the lid, as well as over the lid itself. If however the material covers the greater part, or even the whole, of the container then such material is commonly referred to as a "sleeve". A sleeve may be used primarily for decoration or carrying information, but if it covers the lid as well, then it may also serve as a seal. In this Specification, the term "band " is used throughout though it is to be understood that this is intended to embrace to all kinds of tubular heat-shrink bands and sleeves, irrespective of the length of the container covered thereby.

A known form of apparatus for applying a heat-shrink band to a container and its lid is described for example in U.S. Pat. No. 4,562,684 (Dreher). This apparatus comprises a wheel carrying a plurality of reciprocating mechanisms arranged to feed a predetermined length of tubular material over a container top each time a container is located at a banding station, there being a guillotine to sever a lengths of the material for picking up by the mechanisms on the wheel. The reciprocating mechanisms grip the material when in a folded-flat condition, and then open it out by separating, in order to allow the material to be fitted over a container top.

A disadvantage of the apparatus described above is that since it includes several reciprocating parts, its speed of operation is significantly limited thereby. Moreover, the reliability of operation is not that high, and mis-feeds are frequently encountered for instance because a cut band has not sufficiently been opened out to receive a container top. The mis-fed band must then be cleared before the apparatus may continue to operate, lowering the through-put. It is a principal aim of the present invention to address these short-comings of the known apparatus.

SUMMARY OF THE INVENTION

In view of the above, it is a principal aim of the present invention to provide apparatus for applying tubular bands to articles advanced along a path, comprising:

article advancement means to advance said articles one at a time along a path through a banding station where said bands are applied to the articles;

band supply means for supplying a continuous web of flattened tubular banding material;

band re-folding means to open out the supplied web of flattened banding material and then to re-fold and re-flatten the banding material with folds disposed mid-way between the original folds;

band feed means to advance the re-folded banding material towards a band pick-up station and to deliver to that pick-up station a plurality of bands, one at a time, each comprising a predetermined length of the banding material, cut from the re-folded web thereof;

a rotary banding drum;

at least one gripper head mounted on said rotary banding drum so that on rotation of said drum the gripper head passes sequentially through the pick-up station and the banding station, the gripper head having at least one vacuum port facing the direction of movement of the gripper head upon said rotation of the drum;

gripper control means to control the supply of vacuum to the vacuum port of said gripper head whereby said head may, on passing through the pick-up station, pick up a band advanced to that pick-up station by vacuum-holding only one side face of that band against the gripper head, and may release that band as said head passes through the banding station; and means to synchronise the rotation of said drum with the advancement of articles along said path whereby a band held by one side face on the griper may partially and resiliently open out during the passage thereof from the pick-up station to the banding station and may there be slid on to an article during the advancement thereof through the banding station.

According to another aspect of this invention, there is provided a method of applying tubular bands to articles advanced through a banding station, in which method: banding material is drawn from a supply of folded-flat banding material; the banding material is opened out and re-folded and re-flattened with the folds disposed mid-way between the original folds; the re-folded banding material is advanced to a pick-up station and is severed into bands each of a predetermined length which bands are delivered one at a time to the pick-up station; a delivered band is picked-up by a gripper head mounted on a rotary drum, the band being held by only one side face to a vacuum port provided in the gripper head and facing the direction of advancement of the gripper head; the band is advanced to said banding station by rotation of the drum, during which advancement the band is allowed partially and resiliently to open out whilst being held only by said one side face;-.and the drum rotation is synchronised to the advancement of the articles thereby to apply a band to an article by entering the top of an advancing article into a partially opened-out band, whereafter said band is rolled on to the article top by the synchronised movement of the drum with the advancing article.

It will be appreciated that in the present invention, a band is transferred from a cutter on to an article (such as a container) by a rotary drum which in effect rolls the band on to the article top. By gripping the band by one side face, the band will partially open, by virtue of the "memory" of the plastics material and its resilience following the re-folding of the banding material. Then, as the band is applied to an article top, that top will itself serve further to open the band as necessary, whereby the band may be fitted over the article top. Such operation requires no reciprocating parts, and consequently the apparatus may operate at relatively high speeds. Moreover, since the article top itself serves to assist the opening out of the band, the likelihood of a mis-feed is much reduced.

In general, the article referred to above will be a container having a removable lid, though it will be appreciated that articles other than containers as such may have a band fitted thereto by the apparatus of this invention. Moreover, a container may have a band indirectly fitted thereto, by using the apparatus of this invention to slide a band on to a mandrel of a suitable form and diameter, and then in a subsequent operation aligning the mandrel carrying a band with a container, and sliding the band off the mandrel and on to the container. In the following, references will exclusively be made to "containers", though it will be understood that this term extends to other articles which could be fitted with a band by the apparatus, as well as true containers, as such.

BRIEF DESCRIPTION OF THE DRAWINGS

The invention will be described in greater detail, and one specific example thereof will be given, referring as necessary to the accompanying drawings.

In the drawings:

FIG. 1 is an isometric view the banding material feed part of the embodiment of apparatus of this invention;

FIGS. 2A and 2B represent cross-sections through the banding material at the input to and output from the material feed part illustrated in FIG. 1;

FIG. 3 shows four cross-sections through the material feed part, taken on lines W—W, X—X, Y—Y and Z—Z, all marked on FIG. 1;

FIG. 8 illustrates diagrammatically the banding drum, partly cut away, used in the embodiment of this invention;

FIGS. 9A, 9B and 9C show alternative head configurations; and

DESCRIPTION OF THE PREFERRED EMBODIMENT

Figure 4:
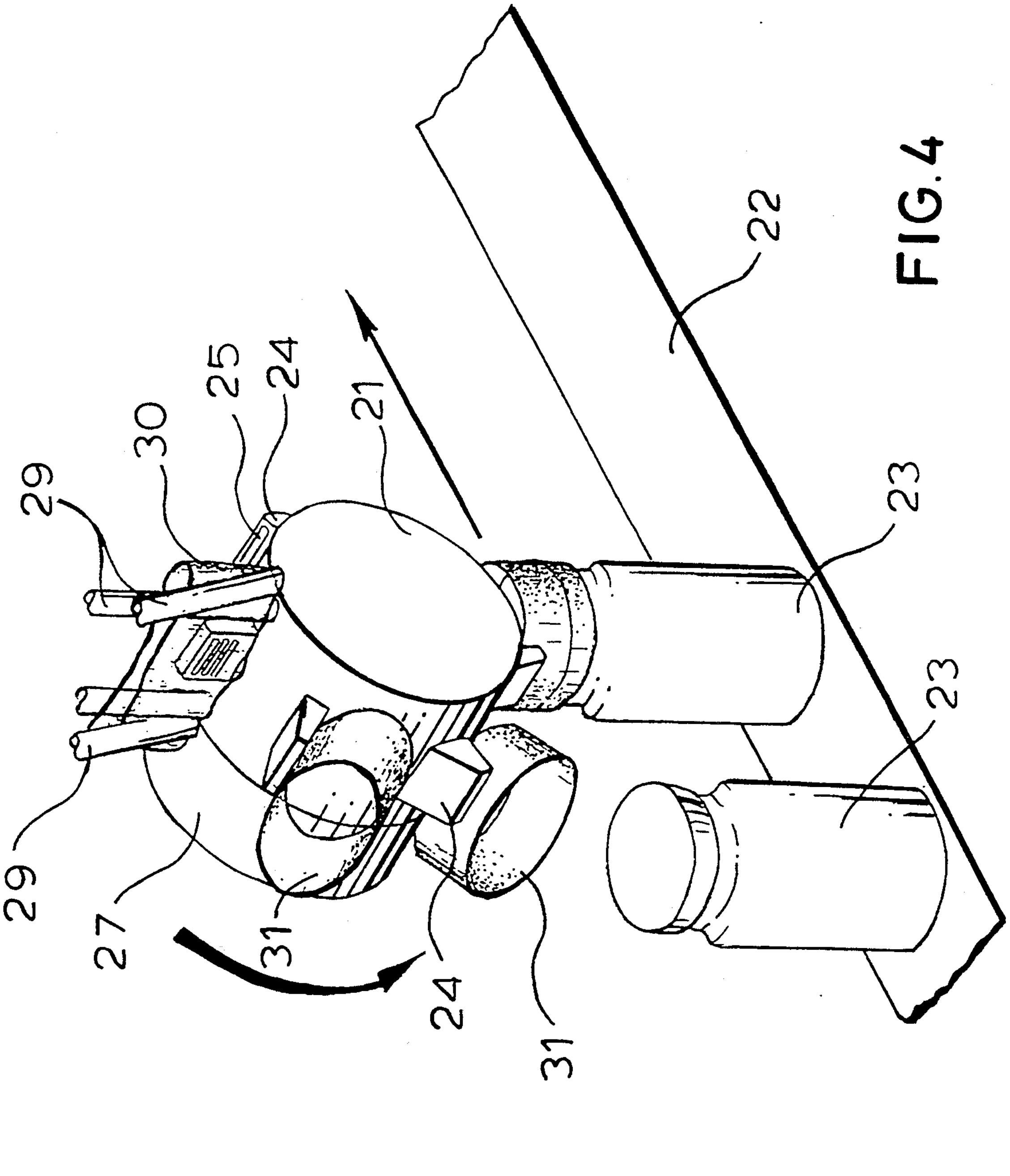
FIG. 4 is an isometric view of pick-up and banding stations of the embodiment of apparatus of this invention, for use with the feed part of FIG. 1.

In the present invention, the material feed means preferably comprises a roller nip through which the tubular banding material passes in a substantially flat condition. The feeding of a predetermined length may be achieved by controlling the angle through which the rollers of the nip turn each time a fresh length is to be advanced, or by monitoring the material itself—for example, by observing the movement of a mark or index pre-printed on the material.

Tubular heat-shrink banding material for sealing containers is normally supplied in roll form with the material folded flat. In the apparatus of the present invention, the material to be opened out and then refolded with the principal cross-sectional axis substantially at right angles to the original principal cross-sectional axis, prior to the material being advanced by the feed means. This enables the "memory" of the material to open-out a band cut from the material, during the transfer of the band from the pick-up station to the banding station.

The cutter means may comprise a reciprocating blade operating in conjunction with another blade or an anvil, the operation of the blade being timed to the actuation of the feed means. In the alternative, the cutter means may comprise a rotary guillotine, so as thereby to obviate the need to have reciprocating parts.

The gripper head, or each gripper, if there is more than one, upstands generally radially from the drum periphery, and is provided with at least one suction port on the head surface which faces forwardly on rotation of the drum, through which port air may be drawn in a timed relationship to the rotation of the drum. In this way, the head may engage one external side part of a severed band and then, by the suction, hold that band as the head advances on rotation of the drum from the pick-up station to the banding station. During this motion of the head, the band will at least partially open out under its own natural resilience, whereby the top of an advancing container may enter into the band and then further open out that band to accept the whole of the container top.

Most preferably, the head on the banding drum is replaceable by another head of a different configuration, in order to permit the easy adaptation of the apparatus to bands of different lengths and diameters. Moreover, it is preferred for the banding drum to be arranged to support more than one head, and typically four or more heads, in order to allow the greatest possible time for a band picked up at the pick-up station to open out sufficiently to enable a container top to enter thereinto, at the banding station. For example, with six heads, a band would be rolled on to a container top two cycles of operation after being picked up at the pick-up station.

The control means could comprise a quite separate valve mechanism for each head, operated in a timed relation to the rotation of the banding drum. It is however preferred for the drum to be mounted on a vacuum manifold and for the drawing of air through the ports of each gripper head to be controlled by a transfer port on the drum coming into and out of the register with the manifold.

The article advancement means may comprise a simple conveyer on which containers to be banded are supported and advanced through the banding station. In this case, there should be a detector arranged to detect the presence of a container about to be advanced through the banding station, whereby the banding drum may be actuated in synchronism with the advancement of the container, so enabling a band properly to be fitted on top of a container. This arrangement allows irregular container feeding but in the alternative, a positive-feed conveyer may be employed the operation of which is synchronised to the rotation of the banding drum, whereby essentially continuous rotation of the drum may be obtained, synchronised to the advancement of containers through the banding station.

It is preferred for there to be provided means to hold a severed band at the pick-up station, whilst the band awaits the next cycle of operation. Such means advantageously comprises a plurality of fingers defining a labyrinthine path restraining the band from opening out until pulled free of those fingers, by a head on the drum. It has been found that on a head of the drum pulling a band clear of the fingers, there is a tendency for the band to be encouraged to return to its opened-out condition, so assisting the reliability of the apparatus.

Apparatus of this invention comprises a main frame (not shown) on which is mounted a banding material feed arrangement (FIG. 1) and a rotary banding drum (FIG. 4), the main frame being associated with a container conveyer which transports containers to be banded below the banding drum.

The tubular heat-shrink banding material 10 is in the form of a flat web which is drawn from a reel (not shown) by a suitable de-spooler (also not shown), the material being opened out and reformed by a device 11 carried on a back plate 12, which is adjustably mounted on the main frame for movement in the vertical direction. The device 11 includes two pins 13 each supporting a grooved roller 14 at its end remote from plate 12. A material separator 15 is located within the tubular banding material 10, the separator comprising two flat plates attached to one another with their planes at right angles, each plate having a rectangular portion and a triangular portion contiguous therewith, the plates being attached to one another so that the apices of their two triangular parts are adjacent. The edges of the upper plate defining its triangular part rest in the grooves of the rollers 14, but with the material 10 between the plate and the rollers, whereby the drawing of material through the reforming device 11 causes the material to reform into a flat tube the principal cross-sectional axis of which is substantially at 90° to that of the material delivered to the device 11, as illustrated in FIGS. 2A and 2B, and in the sectional views of FIG. 3. The material has a "memory " and thus, when reformed, does not lie flat, but has a natural tendency to try to return to its original shape; the material thus takes up a profile somewhat as shown in FIG. 2B.

Also mounted on back plate 12 is a roller nip 17, defined by a drive roller 18 and an idler roller 19. The drive roller 18 is turned by an electric motor (not shown) acting through a clutch/brake mechanism (also not shown) to enable the feeding of a succession of predetermined lengths of material 10, as and when required. Control of the drive roller 18 to ensure the correct length is fed may be performed by photoelectric switches triggered by suitable index marks pre-printed on the material 10, or by controlling the angular movement of the drive roller 18, on each actuation. In the latter case, an optical encoder may be associated with the drive roller, the output of which encoder may be used to control the clutch/brake mechanism associated with the drive roller.

From the nip 17, the material passes though a cutter 20, adapted to sever an advanced length of the material 10. The cutter 20 may comprise a reciprocating knife guillotine, a rotary cutter, or the like.

Driving the nip 17 in a cycle of operation causes the cut edge of the material 10, lying within the cutter 20, to be advanced by a predetermined distance, whereby that cut edge then lies adjacent a banding drum 21, described in detail below. Then, the cutter 20 is operated to sever the advanced length thereby forming a band which awaits being picked up by the banding drum, as will be described below. Once that band has been removed by the drum 21, the cycle may be repeated to form the next band.

FIG. 4 illustrates the banding drum 21, in conjunction with a conveyer 22 for containers 23 to be banded by the apparatus. The drum 21 has on its outer periphery a series of upstanding heads 24, each of which has three forwardly-facing suction ports 25, communicating with an associated transfer passage 26 (FIG. 8) leading to the side face of the drum nearer the back plate 12. The drum is rotatably mounted on a cylindrical manifold 27 having an arcuate suction opening 28 formed in the side face thereof against which the drum 21 bears. Rotation of the drum causes each transfer passage 26 to come into and out of register with the arcuate suction opening 28 of the manifold 27, thereby controlling the timing of the suction occurring at the ports 25 in each head 24. The drum 21 is driven on each cycle of operation by an electric motor acting through a clutch/brake mechanism (not shown).

Also illustrated in FIG. 4 are two pairs of fingers 29, described in further detail below, arranged to hold a band 30 severed by the cutter 20, until that band is picked up by a head 24 on rotation of the drum 21.

The operation of the feed arrangement is timed to the rotation of the drum 21 such that the feeding of the material 10 by the nip 17 occurs immediately after a head 24 picks up a previously cut band. The vertical position of the back plate 12 is adjusted such that when the required length has been advanced, the lower edge of the band lies closely adjacent the drum periphery, whereby the band will cover the ports 25 in an advancing head 24. The suction is applied to ports 25 in the head as the head engages a band held by fingers 29, so that the head may pick up a band and pull it free of the fingers 29. The band 30 then tends to return to its original shape, as illustrated at 31, in FIG. 4.

Figure 5:
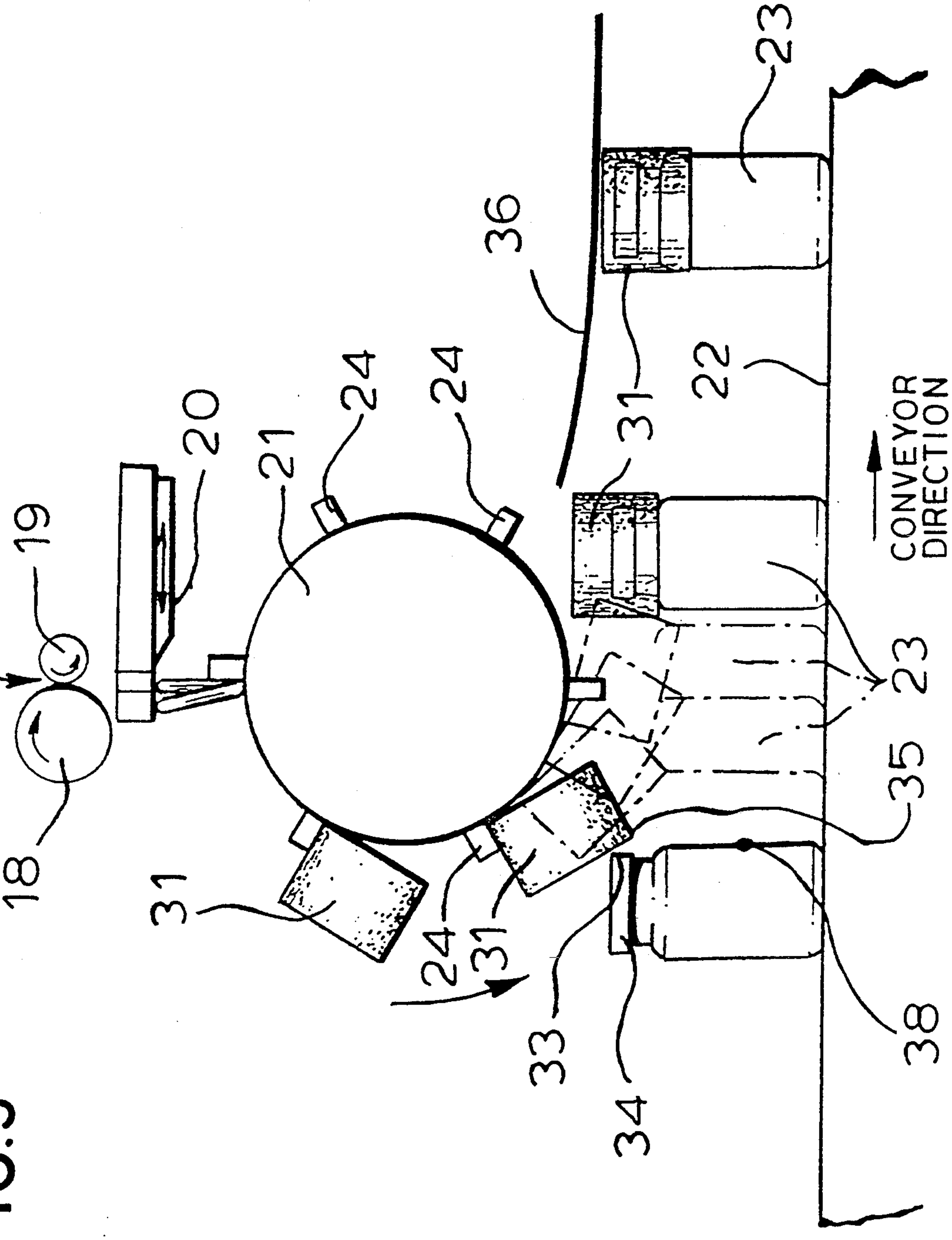
FIG. 5 is a side view of apparatus of this invention, showing its use in banding containers.

The operation described above is synchronised to the advancement of containers 23 on the conveyer 22, such that as a container 23 approaches the lower-most part of the drum 21, so too does a held band, by rotation of the drum. In this way, the leading edge 33 of a container lid 34 will engage inside leading part 35 of a held band 31, and then that band will be rolled on to the top of the container, as best seen in FIG. 5.

On subsequent movement of the container away from the drum 21, the container passes beneath a guide plate 36, which engages the top of the band and urges it down on to the container, to the required extent. Then, the band is shrunk on to the container and its lid by a hot-air blast.

Though it would be most advantageous for the apparatus to operate with the drum 21 rotating essentially continuously, nevertheless in order to allow the accommodation of an intermittent or irregular supply of containers on the conveyer 22, a detector 38 (such as a photo-electric cell) is arranged to detect the front edge of an advancing container. When a container is so detected, then the drum 21 is triggered to turn through one pitch in synchronism with the container movement, so rolling a held band on to the top of that container. Concurrently with that, the last severed band is picked up from beneath the cutter 20, and immediately thereafter the nip 17 is cycled to advance another length of material 10, followed by operation of the cutter 20 to cut another band, which then awaits picking-up during the next cycle of operation.

Figure 6B:
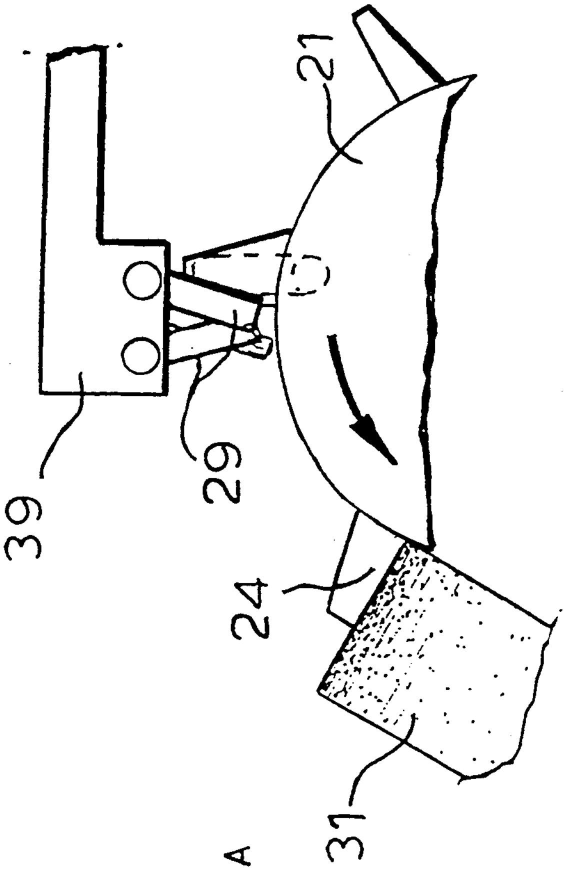
FIGS. 6A and 6B are respectively front and side views on the pick-up station.
Figure 6A:
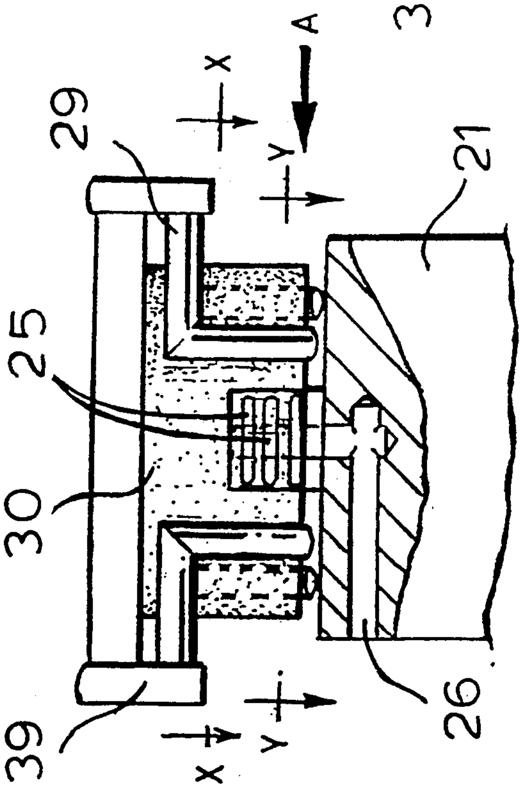
Figure 7B:
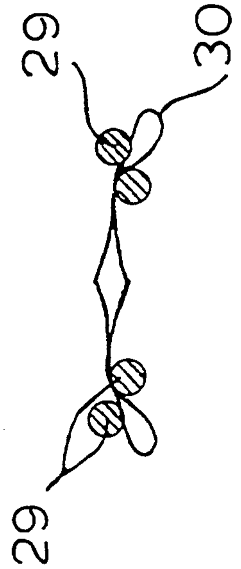
FIG. 7 represents two cross-sectional views taken on lines X—X and Y—Y, shown in FIG. 6A.
Figure 7A:
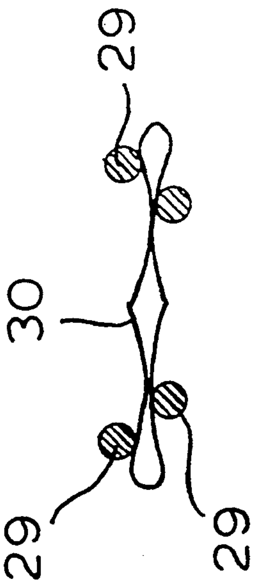

FIGS. 6A, 6B and 7 show in greater detail the fingers 29 which hold a cut band 30, until that band is picked up by a head 24. The fingers 29 are each generally L-shaped, and are adjustably mounted on a carrier 39 mounted below the cutter 20. On each side of the head 24, the pair of fingers may be moved closer together or further apart and the angle therebetween adjusted, so as to obtain the optimum holding characteristics without damaging the band 30. Moreover, by appropriate adjustment of those fingers, the material may be encouraged to return to its original tubular shape as a head 24 draws the material from between the fingers, on rotation of the drum 21.

FIGS. 9A, 9B and 9C diagrammatically illustrate three alternative head designs, for use with different diameters and lengths of bands. Also as a consequence of the different band lengths and diameters, the configuration of the suction ports 25A, 25B and 25C differs for each of the illustrated heads 24A, 24B and 24C. The different band lengths as well as the different head radial lengths are accommodated by adjusting the position of the plate 12 (FIG. 1) on the main frame, with respect to the drum axis. Also, the relative position of the drum axis with respect to the conveyer has to be adjusted, to accommodate both different band lengths and container heights.

Figure 10:
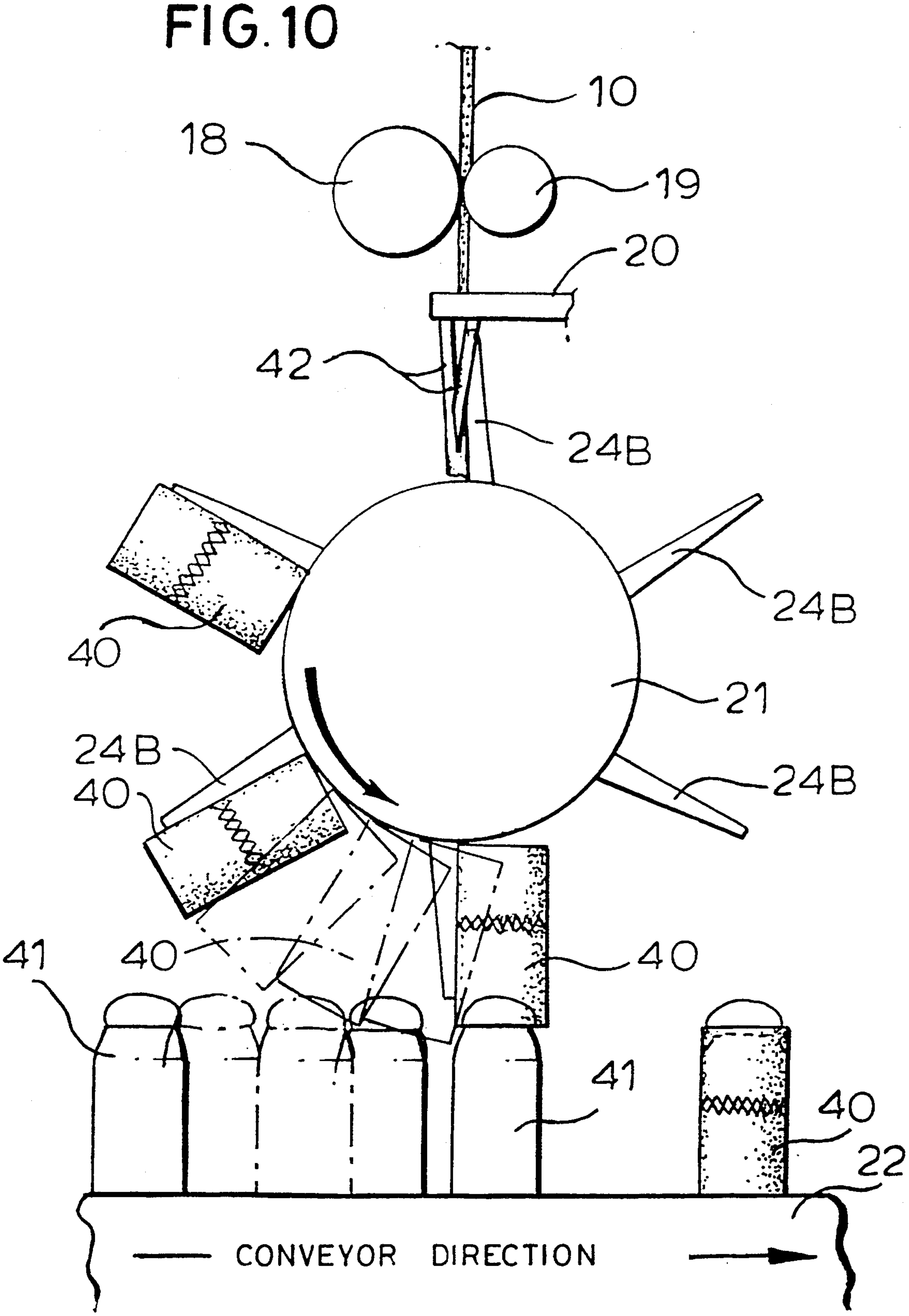
FIG. 10 shows diagrammatically a side view of alternative arrangement of apparatus of this invention, for applying sleeves to containers.

FIG. 10 illustrates an alternative configuration for banding apparatus of this invention, though like parts with those of FIGS. 1 to 8 are given like reference characters and will not be described again here. In the arrangement of FIG. 10, the apparatus has been configured to apply relatively long bands 40 (commonly referred to as sleeves) to containers 41 being advanced along conveyer 22, the drum 21 being fitted with heads 24B (also shown in FIG. 9B) which heads are adapted to hold those bands 40. In order to accommodate the length of such a band, the spacing between the cutter 20 and the drum 21 is increased, as is the distance between the drum axis and the conveyer. The holding fingers 30 are replaced by longer fingers 42, adapted to hold the relatively long band 40 but in other respects this apparatus is essentially the same as that which has been described above, and operates in the same manner.

In the arrangement illustrated in FIG. 5, it is important that the band does not slip down a container and so clear of the lid, prior to the heat-shrinking step. The reluctance of the band fully to open out, by virtue of the creases resulting from the spooling of the material, give sufficient friction to ensure the band stays at the position to which it has been pressed by guide plate 36. By contrast, in the arrangement illustrated in FIG. 10, it is advantageous for the band (sleeve) to slip down the full length of the container. To assist this, an ironing device (not shown) may be fitted to the back plate 12 between the separator 15 and the nip 17, to iron out the creases in the material whereby it more readily resumes its truly circular cross-sectional shape.

I claim:

1. A method of applying tubular bands to articles advanced through a banding station, in which method: banding material is drawn from a supply of folded-flat banding material; the banding material is opened out and re-folded and re-flattened with the folds disposed mid-way between the original folds; the re-folded banding material is advanced to a pick-up station and is severed into bands each of a predetermined length which bands are delivered one at a time to the pick-up station; a delivered band is picked-up by a gripper head mounted on a rotary drum the band being held by only one side face to a vacuum port provided in the gripper head and facing the direction of advancement of the gripper head; the band is advanced to said banding station by rotation of the drum, during which advancement the band is allowed partially and resiliently to open out whilst being held only by said one side face; and the drum rotation is synchronised to the advancement of the articles thereby to apply a band to an article by entering the top of an advancing article into a partially opened-out band, whereafter said band is rolled on to the article top by the synchronised movement of the drum with the advancing article.

2. A method according to claim 1, in which a band severed from the banding material is held after being severed but before being picked up by said gripper head, by means of a plurality of fingers defining a labyrinthe path along which the band extends 3. A method according to claim 2, in which said fingers are arranged to lie generally parallel to the length of a band, and said fingers are adjustable to suit the diameter and length of a band as well as the physical characteristics of the material from which the band is made.

4. A method according to claim 1, in which the band is indirectly fitted to an article, by sliding said band on to a mandrel of a suitable form and diameter, and then in a subsequent operation the mandrel carrying a band is aligned with said article, and the band is slid off the mandrel and on to the article.

5. Apparatus for applying tubular bands to articles advanced along a path, comprising:

article advancement means to advance said articles one at a time along a path through a banding station where said bands are applied to the articles;

band supply means for supplying a continuous web of flattened tubular banding material;

band re-folding means to open out the supplied web of flattened banding material and then to re-fold and re-flatten the banding material with folds disposed mid-way between the original folds;

band feed means to advance the re-folded banding material towards a band pick-up station and to deliver to that pick-up station a plurality of bands, one at a time, each comprising a predetermined length of the banding material, cut from the re-folded web thereof;

a rotary banding drum;

at least one gripper head mounted on said rotary banding drum so that on rotation of said drum the gripper head passes sequentially through the pick-up station and the banding station, the gripper head having at least one vacuum port facing the direction of movement of the gripper head upon said rotation of the drum;

gripper control means to control the supply of vacuum to the vacuum port of said gripper head whereby said head may, on passing through the pick-up station, pick up a band advanced to that pick-up station by vacuum-holding only one side face of that band against the gripper head, and may release that band as said head passes through the banding station; and means to synchronise the rotation of said drum with the advancement of articles along said path whereby a band held by one side face on the gripper may partially and resiliently open out during the passage thereof from the pick-up station to the banding station and may there be slid on to an article during the advancement thereof through the banding station.

6. Apparatus as claimed in claim 5, wherein the band feed means comprises a pair of rollers defining a roller nip through which the re-folded tubular band material passes in a substantially flat condition.

7. Apparatus as claimed in claim 6, wherein means are provided to control the angle through which said rollers of the nip turn each time a fresh length of band material is to be advanced, so as thereby to feed a predetermined length of the material.

8. Apparatus as claimed in claim 5, wherein the band re-folding means includes first and second pairs of rollers each pair defining a respective roller nip and the rollers of one nip being arranged at right angles to the rollers of the other nip; and a re-folding member located within the tubular band, between the two roller nips.

9. Apparatus according to claim 5, wherein the band feed means includes a reciprocating blade arranged to sever a band of a predetermined length from banding material still to be advanced, the operation of the blade being timed to the actuation of the feed means.

10. Apparatus according to claim 5, wherein the or each said gripper head upstands generally radially from the drum periphery.

11. Apparatus according to claim 10, wherein there is a plurality of similar heads upstanding in an equi-spaced relationship from the periphery of the drum.

12. Apparatus according to claim 11, wherein said gripper control means includes a separate valve mechanism for each gripper head respectively, each said valve mechanism being operated in a timed relation to the rotation of the banding drum.

13. Apparatus according to claim 12, wherein said drum is mounted on a vacuum manifold, and the drawing of air through the ports of the gripper heads is controlled by a transfer port on the drum coming into and out of register with the manifold as the drum is rotated.

14. Apparatus according to claim 5, wherein the article advancement means comprises a conveyer on which articles to be banded are supported and advanced through the banding station.

15. Apparatus according to claim 5, wherein the synchronising means includes a detector arranged to detect the presence of an article about to be advanced through the banding station, the output of the detector being used to control the actuation of the banding drum, so as to be synchronised to the advancement of the article.

16. Apparatus according to claim 5, wherein there is provided means to hold a band at the pick-up station, whilst the band awaits picking-up by a gripper head.

17. Apparatus according to claim 16, wherein the holding means comprises a plurality of fingers defining a labyrinthine path and between which said fingers a severed band is located, thereby to restrain the band from opening-out until pulled free of those fingers, on being picked-up by a gripper head on said drum.

* * * * *